US010600632B2

(12) United States Patent
McClure

(10) Patent No.: US 10,600,632 B2
(45) Date of Patent: Mar. 24, 2020

(54) METHODS FOR OPERATING ELECTROSTATIC TRAP MASS ANALYZERS

(71) Applicant: Thermo Finnigan LLC, San Jose, CA (US)

(72) Inventor: Thomas D. McClure, Sunnyvale, CA (US)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 16/111,024

(22) Filed: Aug. 23, 2018

(65) Prior Publication Data

US 2020/0066504 A1 Feb. 27, 2020

(51) Int. Cl.
*H01J 49/42* (2006.01)
*G01N 30/72* (2006.01)
*H01J 49/00* (2006.01)

(52) U.S. Cl.
CPC ........ *H01J 49/425* (2013.01); *H01J 49/0009* (2013.01); *H01J 49/0036* (2013.01)

(58) Field of Classification Search
CPC .. H01J 49/0036; H01J 49/0009; H01J 49/282; G01N 30/72; G01N 30/8658; G01N 30/8693; G16C 20/20
USPC ..... 250/281, 282, 291; 702/22; 707/999.101
See application file for complete search history.

(56) References Cited

U.S. PATENT DOCUMENTS 5,436,447 A * 7/1995 Shew ...................... H01J 49/38 250/282
6,872,938 B2 3/2005 Makarov et al.
7,994,473 B2 8/2011 Koester
8,853,620 B2 * 10/2014 Lange .................. H01J 49/425 250/281
9,040,907 B2 5/2015 Brucker et al.
9,741,551 B2 8/2017 Makarov
10,192,730 B2 1/2019 Weisbrod et al.
10,242,854 B2 3/2019 Rusinov et al.
2004/0217284 A1 * 11/2004 Malek .................. H01J 49/063 250/291
2006/0027744 A1 2/2006 Stults et al.
2006/0124845 A1 6/2006 Makarov et al.

(Continued)

FOREIGN PATENT DOCUMENTS

EP 3086354 A1 10/2016
WO 2011/141826 A1 11/2011

OTHER PUBLICATIONS

Makarov, "Electrostatic Axially Harmonic Orbital Trapping: A High-Performance Technique of Mass Analysis," Anal. Chem. 2000, 72, pp. 1156-1162.

(Continued)

*Primary Examiner* — David A Vanore
(74) *Attorney, Agent, or Firm* — Thomas F. Cooney

(57) ABSTRACT

A method of operating an electrostatic trapping mass analyzer, comprises: (a) operating the electrostatic trapping mass analyzer at a maximum resolution so as to acquire a transient signal; (b) partitioning the transient signal into signal segments; (c) while a quality metric is either less than a pre-determined minimum threshold or greater than a pre-determined maximum threshold value, performing the steps of: (i) defining a test transient as being equal to either a first one of the segments or a previously defined transient with an appended signal segment; (ii) calculating a mathematical transform of the test transient and thereby generating a spectrum of component frequencies; and (iii) determining the quality metric from the spectrum of component frequencies; and (d) setting an instrumental resolution to be employed for subsequent mass spectral data acquisitions in accordance with a length of the most-recently-defined test transient.

6 Claims, 8 Drawing Sheets

(56) References Cited

U.S. PATENT DOCUMENTS

| | | | | |
|---|---|---|---|---|
| 2007/0143319 | A1* | 6/2007 | Malek | H01J 49/0036 |
| 2007/0203652 | A1* | 8/2007 | Horning | H01J 49/0009 702/19 |
| 2008/0203293 | A1* | 8/2008 | Makarov | H01J 49/0009 250/283 |
| 2008/0315080 | A1* | 12/2008 | Makarov | H01J 49/425 250/281 |
| 2010/0207020 | A1* | 8/2010 | Jertz | H01J 49/38 250/282 |
| 2011/0240841 | A1 | 10/2011 | Lange | |
| 2012/0109537 | A1 | 5/2012 | Makarov | |
| 2014/0027629 | A1* | 1/2014 | Makarov | H01J 49/005 250/282 |
| 2015/0325424 | A1* | 11/2015 | Aizikov | H01J 49/24 250/288 |
| 2015/0364303 | A1* | 12/2015 | Remes | H01J 49/0031 250/282 |
| 2016/0314951 | A1* | 10/2016 | Aizikov | H01J 49/0036 |
| 2017/0032950 | A1* | 2/2017 | Tsybin | H01J 49/0031 |
| 2017/0370889 | A1* | 12/2017 | Remes | G01N 30/7233 |
| 2018/0224406 | A1 | 8/2018 | Xuan | |
| 2019/0043704 | A1* | 2/2019 | Kozhinov | H01J 49/0036 |

OTHER PUBLICATIONS

Perry et al., "Orbitrap Mass Spectrometry: Instrumentation, Ion Motion and Applications", Mass Spectrometry Reviews, 2008, 27, pp. 661-699.

Amster, "Special Feature: Tutorial—Fourier Transform Mass Spectrometry", Journal of Mass Spectrometry, vol. 31 (1996), pp. 1325-1337.

Hu et al., "The Orbitrap: a new mass spectrometer," J. of Mass Spectrometry, 40, 2005, pp. 430-443.

Qi et al.; "Data processing in Fourier transform ion cyclotron resonance mass spectrometry", Mass Spec Rev, 33 (2014), pp. 333-352.

Strupat et al., "High-Resolution, Accurate-MassOrbitrap Mass Spectrometry—Definitions, Opportunities, and Advantages"; Thermofisher Technical Notes 64287 (2016), https://assets.thermofisher.com/TFS-Assets/CMD/Technical-Notes/tn-64287-hram-orbitrap-ms-tn64287-en.pdf.

Bourmaud et al., "Parallel reaction monitoring using quadrupole-Orbitrap mass spectrometer: Principle and applications", Proteomics (2016), vol. 16 (15-16), pp. 2146-2159.

Gallien et al., "Targeted Proteomic Quantification on Quadrupole-Orbitrap Mass Spectrometer", Molecular & Cellular Proteomics 2012, 11, pp. 1709-1723.

Michalski et al., "Ultra High Resolution Linear Ion Trap Orbitrap Mass Spectrometer (Orbitrap Elite) Facilitates Top Down LC MS/MS and Versatile Peptide Fragmentation Modes", Molecular & Cellular Proteomics, (2012), vol. 11 (3), 11 pages.

Molnarne Guricza et al., "Argentation chromatography coupled to ultrahigh-resolution mass spectrometry the separation of a heavy crude oil", Journal of Chromatography A, (2016), vol. 1484, pp. 41-48.

* cited by examiner

METHODS FOR OPERATING ELECTROSTATIC TRAP MASS ANALYZERS

FIELD OF THE INVENTION

The present invention relates generally to mass spectrometry and mass spectrometers and, more particularly, relates to operation of mass analyzers of the type that that generate a composite time-varying signal, defined over time, that is a summation composed of individual time-varying signals of respective ion species, each of which is defined over time, and from which a mass spectrum is calculated using a mathematical transform operation.

BACKGROUND OF THE INVENTION

Fourier-transform ion cyclotron resonance (FT-ICR) mass analyzers measure mass-to-charge ratios (m/z) of ions indirectly, based on an image current generated by ions moving within a magnetic field of a Penning Trap at their respective cyclotron frequencies. The resulting signal is a time-decaying interferogram known as a transient, defined over the domain of time, that consists of multiple superposed sine waves. The individual frequencies of which the transient is composed may be determined by calculation of a Fourier Transform of the transient signal. The m/z values of the various ion species are calculated from the frequencies.

Electrostatic traps are a different class of mass analyzer in which moving ions experience multiple reflections or deflections in substantially electrostatic fields. In similarity to FT-ICR mass analyzers, electrostatic trap mass analyzers likewise generate a discernible signal by measurement of an image current (i.e., a transient) that is induced within electrodes of the electrostatic by the periodic motion of ion species within the trap. Two known types of electrostatic trap mass analyzers are Cassinian trap mass analyzers (discussed further below) and ORBITRAP™ mass analyzers.

The ORBITRAP™ mass analyzer, which is commercially available from Thermo Fisher Scientific of Waltham Mass. USA, is one such electrostatic trap that has become widely recognized as a useful tool for mass spectrometric analysis. FIGS. 1A and 1B, discussed further below, provide schematic illustrations of an ORBITRAP™ mass analyzer. The main advantages of electrostatic trapping mass analyzers such as Cassinian trap and ORBITRAP™ mass analyzers and of mass spectrometer systems that incorporate them are that they provide accurate mass-to-charge (m/z) measurements and high m/z resolution similar to what is achievable with Fourier Transform Ion Cyclotron Resonance (FT-ICR) mass spectrometry instrumentation but without the requirement for a high-strength magnet. Structural and operational details of ORBITRAP™ mass analyzers and mass spectrometers employing such mass analyzers are described in Makarov, Electrostatic Axially Harmonic Orbital Trapping: A High-Performance Technique of Mass Analysis, Anal. Chem., 72(6), 2000, pp. 1156-1162 and in U.S. Pat. No. 5,886,346 in the name of inventor Makarov and in U.S. Pat. No. 6,872,938 in the names of inventors Makarov et al.

In both FT-ICR and electrostatic trap mass analyzers, ions are compelled to undergo collective oscillatory motion within the analyzer which induces a correspondingly oscillatory image charge in neighboring detection electrodes, thereby enabling detection of the ions. The oscillatory motion used for detection may be of various forms including, for example, circular oscillatory motion in the case of FT-ICR mass analyzers and axial oscillatory motion while orbiting about a central electrode in the case of mass analyzers of the type illustrated in FIGS. 1A-1B. The oscillatory image charge in turn induces an oscillatory image current and corresponding voltage in circuitry connected to the detection electrodes, which is then typically amplified, digitized and stored in computer memory which is, as noted above, referred to as a transient (i.e. a transitory signal in the time domain).

The component frequencies of the transient, as generated by either an FT-ICR apparatus or an electrostatic trap apparatus are related to the mass-to-charge (m/z) values of the ions. Each ion of a given mass to charge (m/z) value will oscillate at a corresponding given frequency such that it contributes a signal to the collective ion image current which is generally in the form of a periodic wave at the given frequency. The total detected image current of the transient is then the resultant sum of the image currents at all the frequencies present (i.e. a sum of periodic signals). Signal frequency analysis (such as Fourier transformation) of the transient yields the oscillation frequencies, where each such frequency is associated with a particular detected ion species. The m/z values of the ions can then be determined (i.e. the mass spectrum) from the frequencies by known equations with parameters determined by prior calibration experiments.

More specifically, an ORBITRAP™ mass analyzer includes an outer barrel-like electrode and a central spindle-like electrode along the axis. Referring to FIG. 1A, a portion of a mass spectrometer system including an ORBITRAP™ mass analyzer is schematically shown in longitudinal section view. The mass spectrometer system 1 includes an ion injection device 2 and an electrostatic orbital trapping mass analyzer 4. The ion injection device 2, in this case, is a curved multipolar curvi-linear trap (known as a "C-trap"). Ions are ejected radially from the "C-trap" in a pulse to the electrostatic trap. For details of the curved trap, or C-trap, apparatus and its coupling to an electrostatic trap, please see U.S. Pat. Nos. 6,872,938; 7,498,571; 7,714,283; 7,728,288; and 8,017,909 each of which is hereby incorporated herein by reference in its entirety. The C-trap may receive and trap ions from an ion source 3 which may be any known type of source such as an electrospray (ESI) ion source, a Matrix-Assisted Laser Desorption Ionization (MALDI) ion source, a Chemical Ionization (CI) ion source, an Electron Ionization (EI) ion source, etc. Additional not-illustrated ion processing components such as ion guiding components, mass filtering components, linear ion trapping components, ion fragmentation components, etc. may optionally be included (and frequently are included) between the ion source 3 and the C-trap 2 or between the C-trap and other parts of the mass spectrometer. Other parts of the mass spectrometer which are not shown are conventional, such as additional ion optics, vacuum pumping system, power supplies etc.

Other types of ion injection devices may be employed in place of the C-trap. For example, the aforementioned U.S. Pat. No. 6,872,938 teaches the use of an injection assembly comprising a segmented quadrupole linear ion trap having an entrance segment, an exit segment, an entrance lens adjacent to the entrance segment and an exit lens adjacent to the exit segment. By appropriate application of "direct-current" (DC) voltages on the two lenses as well as on the rods of each segment, a temporary axial potential well may be created in the axial direction within the exit segment. The pressure inside the trap is chosen in such a way that ions lose sufficient kinetic energy during their first pass through the trap such that they accumulate near the bottom of the axial potential well. Subsequent application of an appropriate voltage pulse to the exit lens combined with ramping of the voltage on a central spindle electrode causes the ions to be emptied from the trap axially through the exit lens electrode and to pass into the electrostatic orbital trapping mass analyzer 4.

The electrostatic orbital trapping mass analyzer 4 comprises a central spindle shaped electrode 6 and a surrounding outer electrode which is separated into two halves 8*a* and 8*b*. FIG. 1B is an enlarged cross-sectional view of the inner and outer electrodes. The annular space 17 between the inner spindle electrode 6 and the outer electrode halves 8*a* and 8*b* is the volume in which the ions orbit and oscillate and comprises a measurement chamber in that the motion of ions within this volume induces the measured signal that is used to determine the ions m/z ratios and relative abundances. The internal and external electrodes (electrodes 6 and 8*a*, 8*b*) are specifically shaped such that, when supplied with appropriate voltages will produce respective electric fields which interact so as to generate, within the measurement chamber 17, a so-called "quadro-logarithmic potential", U, (also sometimes referred to as a "hyper-logarithmic potential") which is described in cylindrical coordinates (r, z) by the following equation:

$$U=\frac{a}{2}\left(Z^2-\frac{r^2}{2}\right)+b\ln\left(\frac{r}{c}\right)+d \quad \text{Eq. 1}$$

where a, b, c, and d are constants determined by the dimensions of and the voltage applied to the orbital trapping analyzer electrodes, where z=0 is taken at the axial position corresponding to the equatorial plane of symmetry 7 of the electrode structure and chamber 17 as shown in FIG. 1B. The "bottom" or zero axial gradient point of the portion of "quadro-logarithmic potential" dependent on the axial displacement (i.e. the portion which determines motion in the axial dimension, z, along the longitudinal axis 9) occurs at the equatorial plane 7. This potential field has a harmonic potential well along the axial (Z) direction which allows an ion to be trapped axially within the potential well if it does not have enough kinetic energy to escape. It should be noted that Eq. 1 represents an ideal functional form of the electrical potential and that the actual potential in any particular physical apparatus will include higher-order terms in both z and r.

The motions of trapped ions within an electrostatic trap of the type illustrated in FIGS. 1A-1B are associated with three characteristic oscillation frequencies: a frequency of rotation around the central electrode 6, a frequency of radial oscillations a nominal rotational radius and a frequency of axial oscillations along the z-axis. In order to detect the frequencies of oscillations, the motion of ions of a given m/z need to be coherent. The radial and rotational oscillations are only partially coherent for ions of the same m/z as differences in average orbital radius and size of radial oscillations correspond to different orbital and radial frequencies. It is easiest to induce coherence in the axial oscillations as ions move in an axial harmonic potential so axial oscillation frequency is independent of oscillation amplitude and depends only on m/z and, therefore, the axial oscillation frequencies are the only ones used for mass-to-charge ratio determinations. The outer electrode is formed in two parts 8*a*, 8*b* as described above and is shown in FIG. 1B. The ions oscillate sinusoidally with a frequency, co, (harmonic motion) in the potential well of the field in the axial direction according to the following Eq. 2:

$$\omega=\sqrt{\frac{k}{(m/z)}} \quad \text{Eq. 2}$$

where k is a constant. One or both parts 8*a*, 8*b* of the outer electrode are used to detect image current as the ions oscillate back and forth axially. The Fourier transform of the induced ion image current signal from the time domain to the frequency domain can thus produce a mass spectrum in a conventional manner. This mode of detection makes possible high mass resolving powers.

Ions having various m/z values which are trapped within the C-trap are injected from the C-trap into the electrostatic orbital trapping mass analyzer 4 in a temporally and spatially short packet at an offset ion inlet aperture 5 that is located at an axial position which is offset from the equatorial plane 7 of the analyzer in order to achieve "excitation by injection" whereby the ions of the ion packet immediately commence oscillation within the mass analyzer in the quadro-logarithmic potential. The ions oscillate axially between the two outer electrodes 8*a* and 8*b* while also orbiting around the inner electrode 6. The axial oscillation frequency of an ion is dependent on the m/z values of the ions contained within the ion packet so that ions in the packet with different ink begin to oscillate at different frequencies.

The two outer electrodes 8*a* and 8*b* serve as detection electrodes. The oscillation of the ions in the mass analyzer causes an image charge to be induced in the electrodes 8*a* and 8*b* and the resulting image current in the connected circuitry is picked-up as a signal and amplified by an amplifier 10 (FIG. 1A) connected to the two outer electrodes 8*a* and 8*b* which is then digitized by a digitizer 12. The resulting digitized signal (i.e. the transient) is then received by an information processor 14 and stored in memory. The memory may be part of the information processor 14 or separate, preferably part of the information processor 14. For example, the information processor 14 may comprise a computer running a program having elements of program code designed for processing the transient. The computer 14 may be connected to an output means 16, which can comprise one or more of: an output visual display unit, a printer, a data writer or the like.

The transient received by the information processor 14 represents the mixture of the image currents produced by the ions of different ink values which oscillate at different frequencies in the mass analyzer. A transient signal for ions of one ink is periodic as shown in FIG. 2A, which shows a "symbolic" approximately sinusoidal transient 21 for just a few oscillations of a single frequency (m/z) component. A representative transient 22 obtained when several different frequencies are combined is shown in FIG. 2B. The m/z value of the ion determines the period (and frequency) of the periodic function. The Single Transient Signal (STS) for single frequency component corresponding to oscillation of ions having mass-to-charge ratio $(m/z)_1$ is approximated by:

$$STS=A\sin(2\pi\omega t+\varphi_0) \quad \text{Eq.3}$$

where A is a measure of the abundance (quantity) of ions having mass-to-charge ratio $(m/z)_1$ in the trap, ω is the frequency, t is time and $\varphi^0$ is the initial phase (at t=0). This equation is only an approximation because it does not account for decay of the amplitude and loss of coherence over time.

The information processor 14 performs a mathematical transform on the received transient in order to derive information relating to the various component STS signals. The mathematical method of discrete Fourier transformation may be employed to convert the transient in the time domain (e.g., curve 22 in FIG. 2B) into a spectrum in the frequency domain. If desired, at this stage or later, the frequency domain spectrum can be converted into the m/z domain by straightforward calculation or calibration. The discrete Fourier transformation produces a spectrum which has a profile point for each frequency or m/z value, and these profile points comprise a peak at those frequency or m/z positions where an ion signal is detected (i.e. where an ion of corresponding m/z is present in the analyzer). Although Fourier Transform methods and algorithms (such as the discrete Fourier transform (DFT) and the fast Fourier transform (FFT)) are often employed to extract information from a transient signal, other mathematical transform procedures may alternatively be employed for the same purpose.

Generally stated, a Cassinian electrostatic ion trap comprises an outer electrode with an ion-repelling electric potential and at least two inner electrodes with ion-attracting potentials, where the outer electrode and the inner electrodes are shaped and arranged in such a way that a harmonic electric potential is formed in one spatial direction and, perpendicular to this spatial direction, an electric potential is formed in which ions move on stable, radial trajectories. For example, a known Cassinian electrostatic ion trap, as described in U.S. Pat. No. 7,994,473, comprises an outer electrode maintained at a first electrical potential and two spindle-shaped inner electrodes both maintained at a same second electrical potential. Together, the outer electrode and inner spindle electrodes generate an electric potential, U, between the electrodes that takes the form of Eq. 4:

$$U(x, y, z) = U_0 + U_C \ln\left[\frac{(x^2+y^2)^2 - 2b^2(x^2-y^2) + b^4}{a^4}\right] - \frac{k}{2}(x^2+y^2) + kz^2 \qquad \text{Eq. 4}$$

where, x, y and z are Cartesian coordinates, $U_0$ is an offset of the potential that is proportional to the voltage between the outer electrode and the inner electrodes, $U_C$ is a scaling factor, and where a, b and k are parameters (constants). The outer electrode and the two spindle-shaped inner electrodes are shaped and arranged such that the inner surface of the outer electrode and the surfaces of the spindle-shaped inner electrodes each correspond to equipotential surfaces of the above electric potential. Accordingly, each spindle electrode is shaped with a diameter that is greatest at its central region and that tapers towards each end. The parameters a and b are related to the radial geometry of the electrode system. The parameter b, which is non-zero, corresponds to the distance between the axis of each spindle and the central z-axis. The parameter k determines the harmonic motion of the ions along the z-axis and is also proportional to the voltage between the outer electrode and the inner electrodes. Specifically, The parameter k, the ion mass m, and the charge z of the ion determine the oscillation frequency ω of the harmonic oscillation along the z-direction:

$$\omega = \sqrt{\frac{2k}{m/z}} \qquad \text{Eq. 5}$$

As noted in the aforementioned U.S. Pat. No. 7,994,473, one way to obtain mass-dependent data from such a Cassinian electrostatic ion trap is to measure the oscillation frequency of ions along the z-direction. Each ion package oscillating inside the Cassinian electrostatic ion trap induces a periodic signal in an ion detector, which is electronically amplified and measured as a function of time. The ion detector comprises detection elements, such as detection coils, in which ion packages induce voltages as they fly through, or detection electrodes, for example segments of the outer electrode or inner electrodes, in which ion packages induce image charges as they fly past. Thus, in analogy to data acquisition procedures employed during operation of an ORBITRAP™ orbital trapping electrostatic trap, a Fourier transform (or other mathematical transform procedure) can be used to transform a measured time signal of z-axis oscillations into a frequency spectrum, which can be converted into a mass spectrum via the known mass dependence of the z-axis oscillation frequency.

The aforementioned U.S. Pat. No. 7,994,473 teaches that ions may be preferably introduced into a Cassinian electrostatic ion trap of the type described above by introduction of the ions into the plane of symmetry (the medial y-z plane) between the two inner electrodes. Upon introduction, such ions begin oscillations parallel to at least the y-axis. Further, if the ions are introduced into the medial y-z plane at a z-axis coordinate that is not at the minimum of the z-axis harmonic potential, they will also immediately start to oscillate along the z-axis. If, however, the ions may are quasi-continuously introduced directly at the potential minimum of the harmonic potential, the ions move with only small amplitudes along the z-axis according to their initial energy in z-direction. After the ions are introduced and stored in the potential minimum in this fashion, they are excited to harmonic oscillations, for example by using a high frequency electric dipole field along the z-axis.

In both the ORBITRAP™ electrostatic orbital trapping mass analyzer and the Cassinian electrostatic ion trap mass analyzer, the z-axis oscillations are mathematically separable from other oscillations and may be mathematically treated as simple harmonic oscillation parallel to the z-axis, wherein an apparent minimum in the z-axis harmonic potential occurs at a central plane of symmetry of the apparatus. In operation of either apparatus, this apparent simple harmonic motion parallel to the z-axis is used to advantage in order to obtain m/z-dependent data which may be used for the purpose of mass analysis.

The resolution of mass spectra acquired with an FT-ICR or electrostatic trap mass analyzer is determined by the so-called "transient length", which is the time during which an image current signal is recorded before the transient data is converted into an m/z spectrum by means (generally) of a Fourier Transform calculation. An increased transient length correlates to greater mass spectral resolution. For example, to achieve a mass spectral resolution of 15000 at an m/z of 200 Th, a transient length of only 32 ms is required whereas the achievement of a mass spectral resolution of 500,000 at the same m/z requires a transient length of greater than 1000 ms.

FIGS. 3A-3B illustrate how mass spectra change with changing settings of resolution. FIG. 3A is a set of three experimental measurements of a portion of the mass spectrum of the fungicide pyrimethanil acquired at resolutions of 15000 (trace 301), 30000 (trace 302) and 60000 (trace 304). At a resolution of 60000, the pyrimethanil peak 307 at 199.11026 Th is fully resolved from the peak 305 of an interfering ion (from the sample matrix) at 199.10570 Th. However, the two peaks merge at resolutions of 30000 and below. At these lower resolution settings, the presence of the interfering ion shifts the centroid of the composite peak to lower m/z values, thereby reducing mass accuracy, and increases the total area under the trace in the region between 100.10 Th to 199.12 Th, thus affecting quantitative analysis. The lack of full resolution of the analyte peak at these lower resolution settings and in the presence of the interfering ion species may therefore lead to a failure to recognize the presence of the analyte in the sample or, otherwise, to an overestimate of its abundance it its presence is recognized.

FIG. 3B is a set of portions of the mass spectrum of sample of $^{13}C$ and $^{15}N$ labeled adenosine triphosphate (ATP; $C_{10}H_{16}N_5O_{13}P_3$) acquired at different resolutions. In sequence, the rows of spectra from top to bottom correspond to resolution settings of 15000, 30000, 60000, 120000 and 240000, respectively. Note that the nominal isobaric m/z of the non-labeled analyte is 508.00302 Th. Accordingly, the first column of spectra, comprising spectra 310-318, correspond to the +3 isotope lines, as obtained at the resolutions noted above. Likewise, the middle column of spectra, comprising spectra 310-318 correspond to the +5 isotope lines and the third column of spectra, comprising spectra 320-328 correspond to the +6 isotope lines. At resolutions of 30000 and below, the isotopic fine structure, representing differing ratios of carbon-to-nitrogen isotope substitution, remain indistinguishable from one another within each of the +3, +5 and +6 envelopes. With increasing resolution however, the emergence of separated peaks becomes increasingly apparent, with partial resolution first becoming evident in the +3 isotope lines at a resolution of 60000 and later becoming evident in the case of greater numbers of isotopic substitutions. Finally, at a resolution of 240000, peaks attributable to different ion species are well resolved.

In practice, it can be difficult to choose an appropriate mass resolution for operating an electrostatic trap mass analyzer of the type illustrated in FIGS. 1A-1B, depending on many factors, such as the degree to mass spectral lines of background substances occur in the vicinity of expected target m/z values, the amount of time available for making each measurement, the abundance of expected analytes, etc. If the resolution is too low, the analyte signal is compromised. On the other hand, if the resolution is too high, the number of mass spectral data acquisitions that may be made of one or more given analyte peak is unnecessarily reduced. Thus, an instrument operator must often make an estimate of a best mass spectral resolution to employ during mass spectral analysis of a sample, based on prior experience with similar samples. Once a resolution is so chosen, the quality of an entire mass spectral run depends on the appropriateness of the operator's choice. Therefore, there in a need in the art of Fourier-Transform mass spectrometry for systematic methods for choosing an appropriate mass spectral resolution setting for any sample and, especially, for choosing an appropriate resolution for a set of measurements while those measurements are in progress. The present invention addresses this need.

SUMMARY OF THE INVENTION

In accordance with a first aspect of the present teachings, a method of operating an electrostatic trapping mass analyzer is provided, the method comprising: (a) operating the electrostatic trapping mass analyzer at a maximum resolution so as to acquire a transient signal; (b) partitioning the transient signal into signal segments; (c) while a quality metric is either less than a pre-determined minimum threshold or greater than a pre-determined maximum threshold value, performing the steps of: (i) defining a test transient as being equal to either a first one of the segments or a previously defined transient with an appended signal segment; (ii) calculating a mathematical transform of the test transient and thereby generating a spectrum of component frequencies; and (iii) determining the quality metric from the spectrum of component frequencies; and (d) setting an instrumental resolution to be employed for subsequent mass spectral data acquisitions in accordance with a length of the most-recently-defined test transient.

In accordance with a second aspect of the present teachings, a method of operating an electrostatic trapping mass analyzer is provided, the method comprising: (a) retrieving or calculating a transient signal corresponding to a previously acquired mass spectrum, wherein the transient signal is defined over a time domain extending from a first end at time $\tau_0$ to a second end at time $\tau_m$, where $\tau_0<\tau_m$; (b) defining a test transient as being equal to the retrieved or calculated transient signal; (c) truncating the previously-defined test transient by eliminating a segment of the previously-defined test transient from the second end of the previously-defined test transient; (d) calculating a mathematical transform of the test transient and thereby generating a test spectrum therefrom; (e) determining a quality metric from the test spectrum; (f) performing, while the most-recently-determined quality metric is either less than a pre-determined minimum threshold value or greater than a pre-determined maximum threshold value, the steps of: (i) truncating the previously-defined test transient by eliminating a segment of the previously-defined test transient from the end of the previously-defined test transient that is opposite to the first end; (ii) calculating a mathematical transform of the test transient and thereby generating a test spectrum therefrom; and (iii) determining the quality metric from the test spectrum; (g) setting a transient length equal to a length of the test transient prior to most recent truncation; and (h) setting an instrumental resolution to be employed for subsequent mass spectral data acquisitions in accordance with the transient length.

BRIEF DESCRIPTION OF THE DRAWINGS

The above noted and various other aspects of the present invention will become apparent from the following description which is given by way of example only and with reference to the accompanying drawings, not drawn to scale, in which.

DETAILED DESCRIPTION

The following description is presented to enable any person skilled in the art to make and use the invention, and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. The particular features and advantages of the invention will become more apparent with reference to the appended figures taken in conjunction with the following description.

Figure 1A:
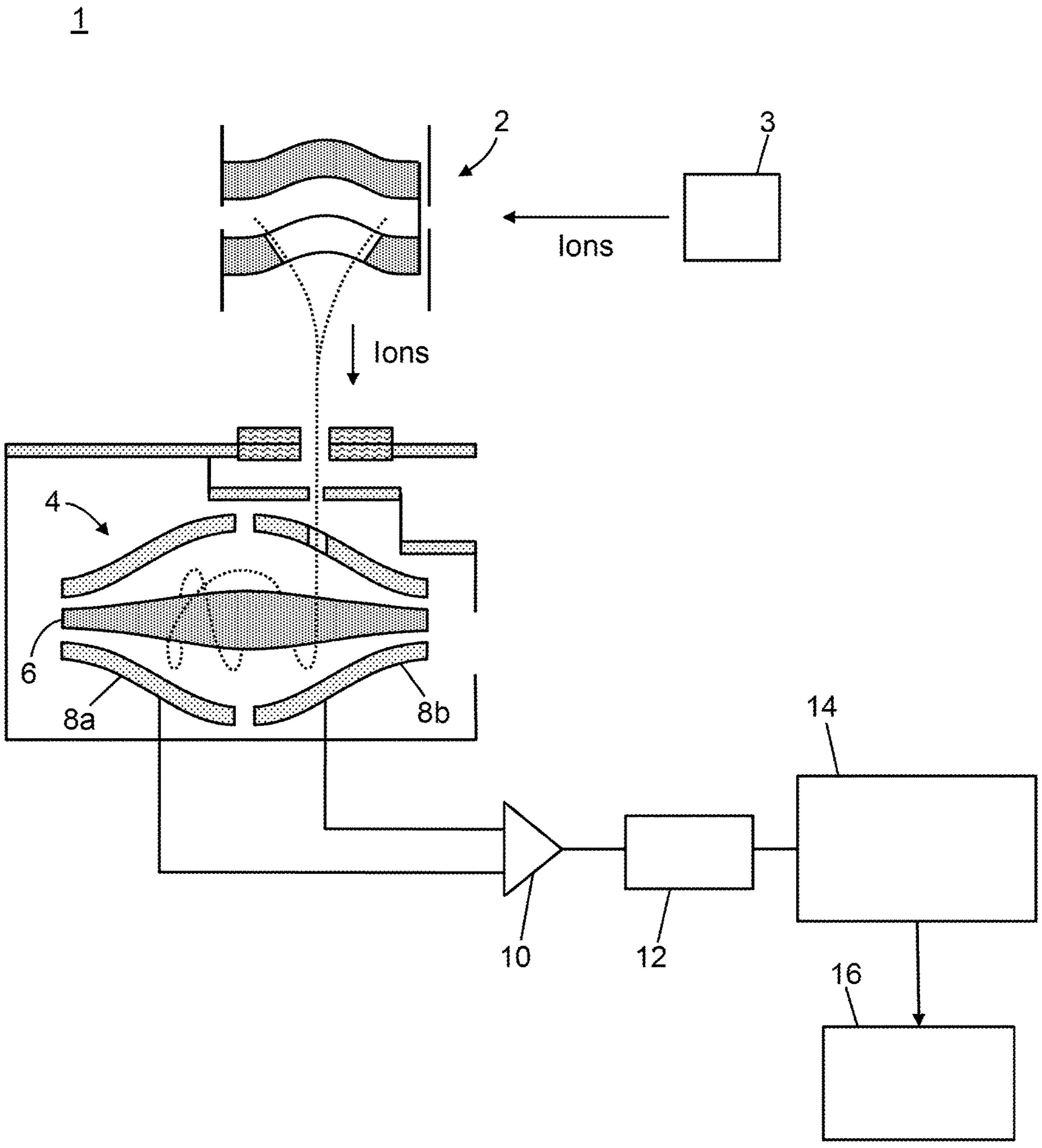
FIG. 1A (Prior Art)
FIG. 1A is a schematic depiction of a portion of a mass spectrometer system including an electrostatic trap mass analyzer, specifically an ORBITRAP™ electrostatic trap mass analyzer.
Figure 1B:
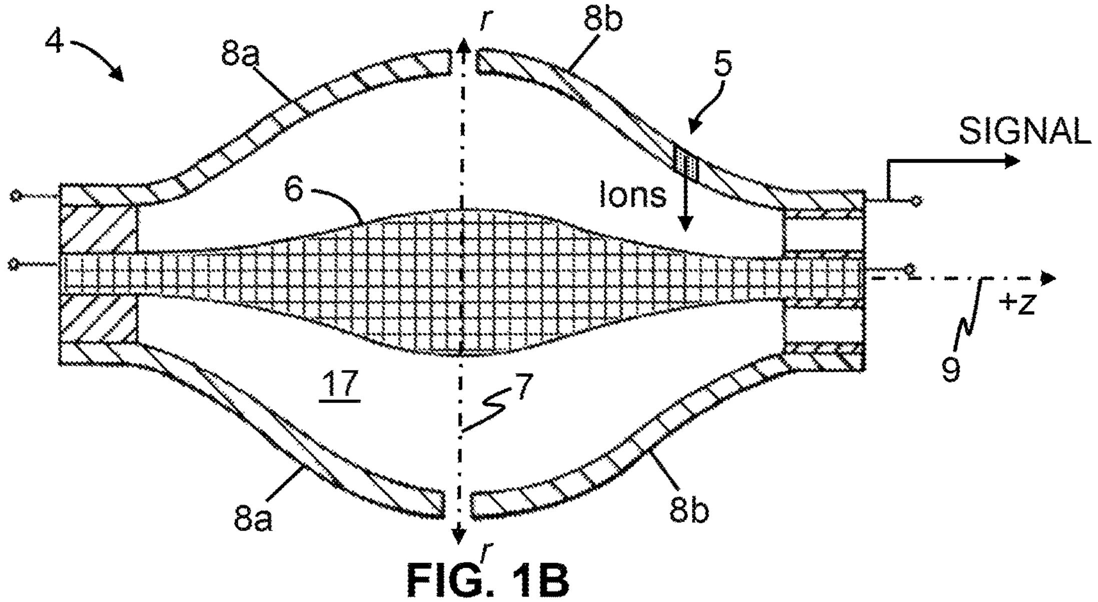
FIG. 1B (Prior Art)
FIG. 1B is an enlarged cross sectional view of the electrostatic trap mass analyzer of FIG. 1A.
Figure 2A:
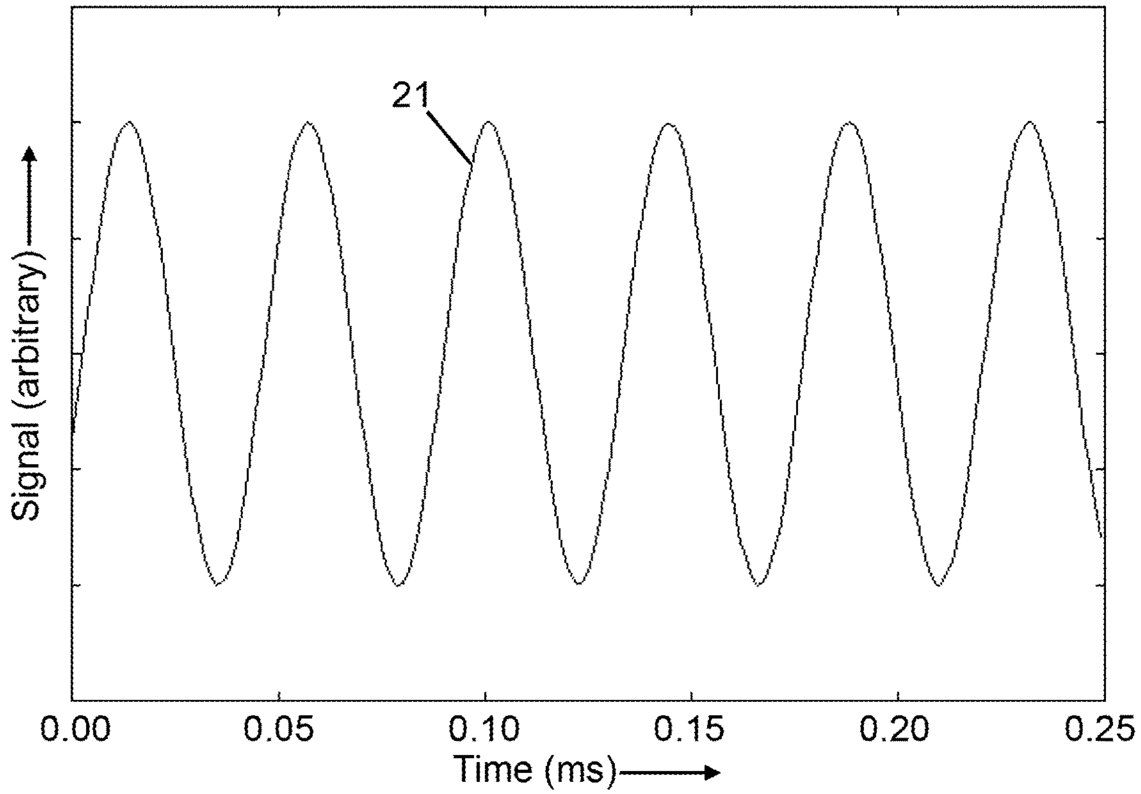
FIG. 2A is a depiction of an "ideal" transient for just a few oscillations of a single frequency component, relating to ions of a particular mass-to-charge (m/z) ratio, as may be measured during operation of the electrostatic trap mass analyzer of FIG. 1A.
Figure 2B:
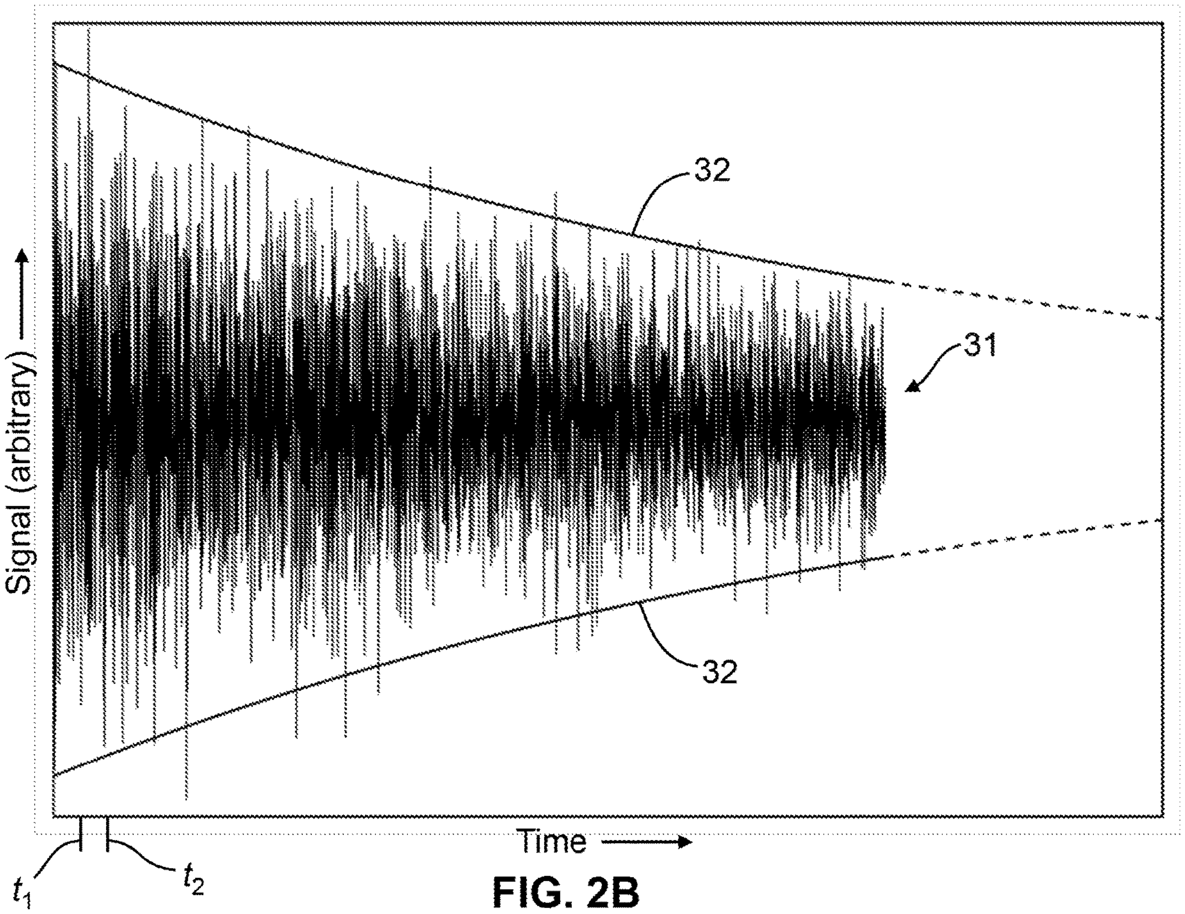
FIG. 2B is a depiction of a simulated transient signal that schematically illustrates the form of an image-current signal and its decay envelope versus time, as may be measured by a Fourier-Transform mass analyzer.
Figure 2C:
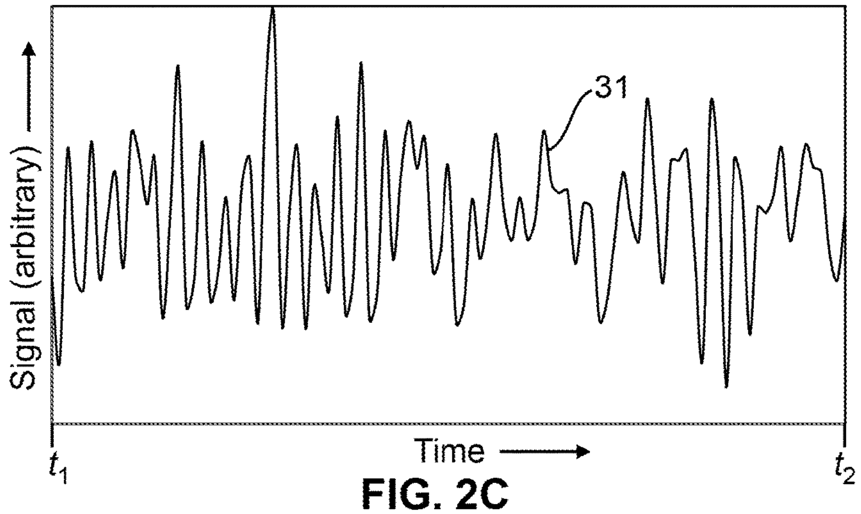
FIG. 2C is an enlargement of a portion of the simulated transient signal of FIG. 2B between the indicated time points t1 and t2.
Figure 3A:
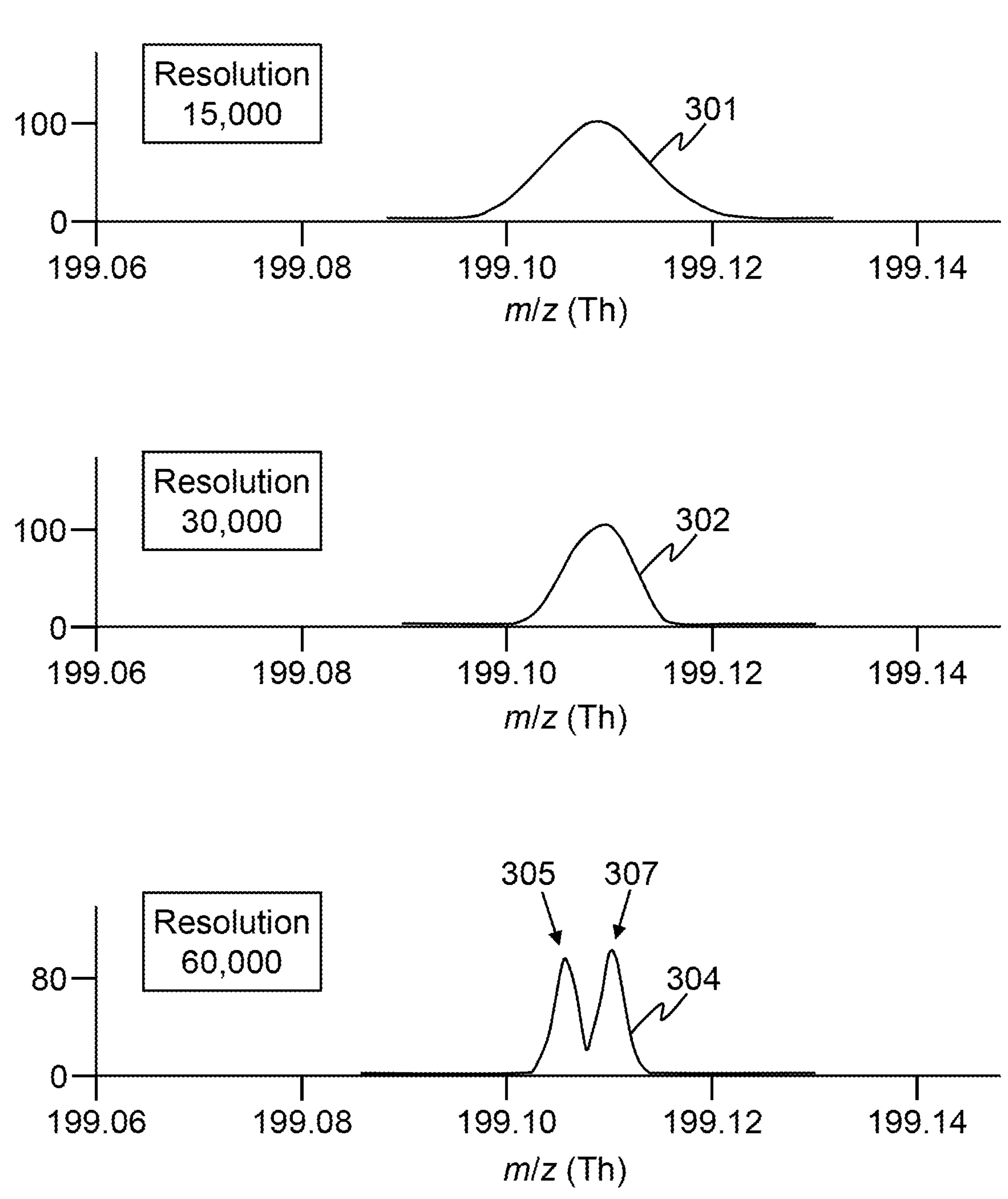
FIG. 3A is a set of three experimental measurements of a portion of the mass spectrum of the fungicide pyrimethanil acquired at resolutions of 15000, 30000 and 60000, from top to bottom, respectively.
Figure 3B:
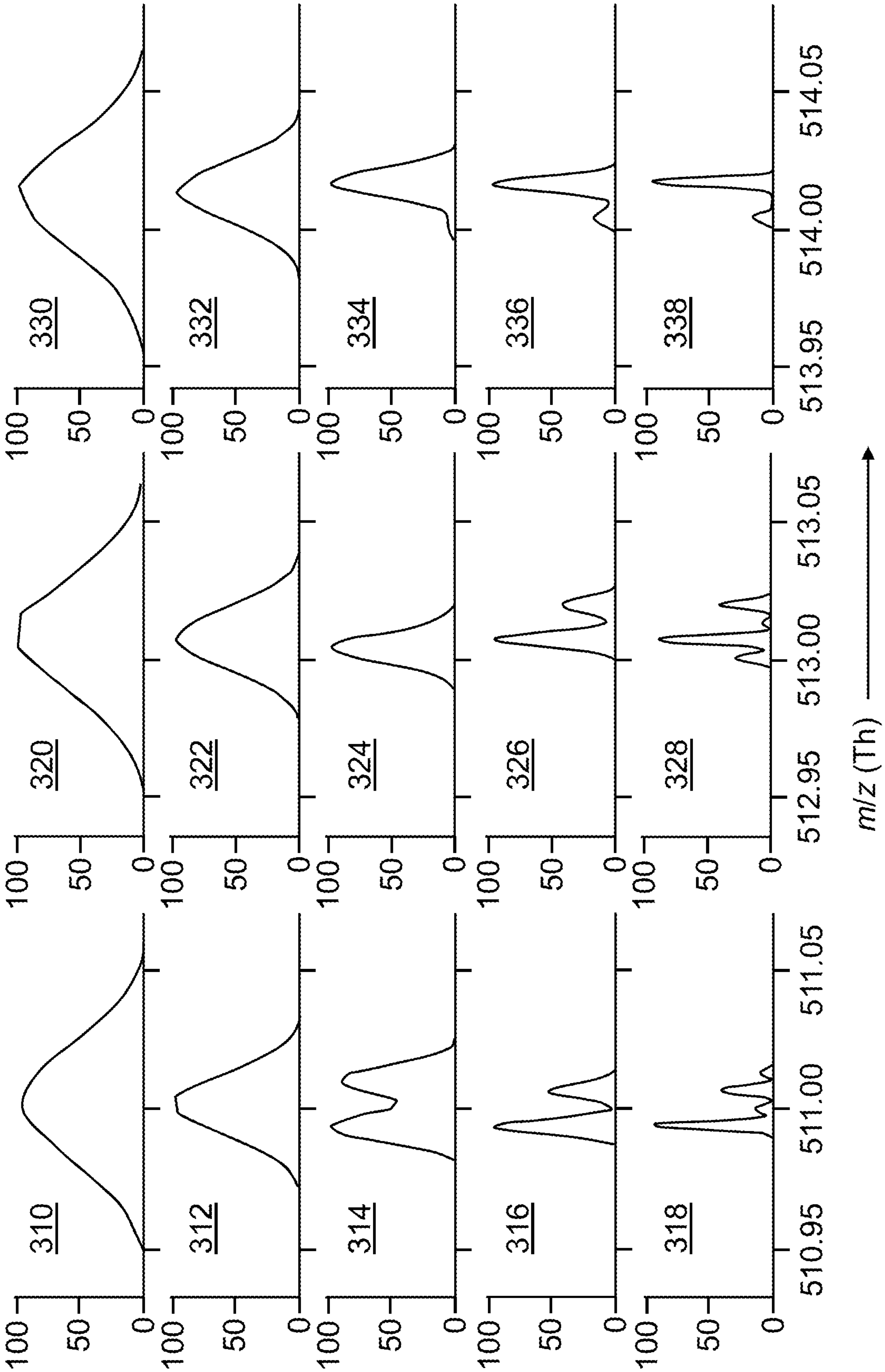
FIG. 3B is a set of portions of the mass spectrum of an isotopically labeled sample of adenosine triphosphate (ATP) acquired at resolutions of 15000, 30000, 60000, 120000 and 240000, from top to bottom, respectively.
Figure 4:
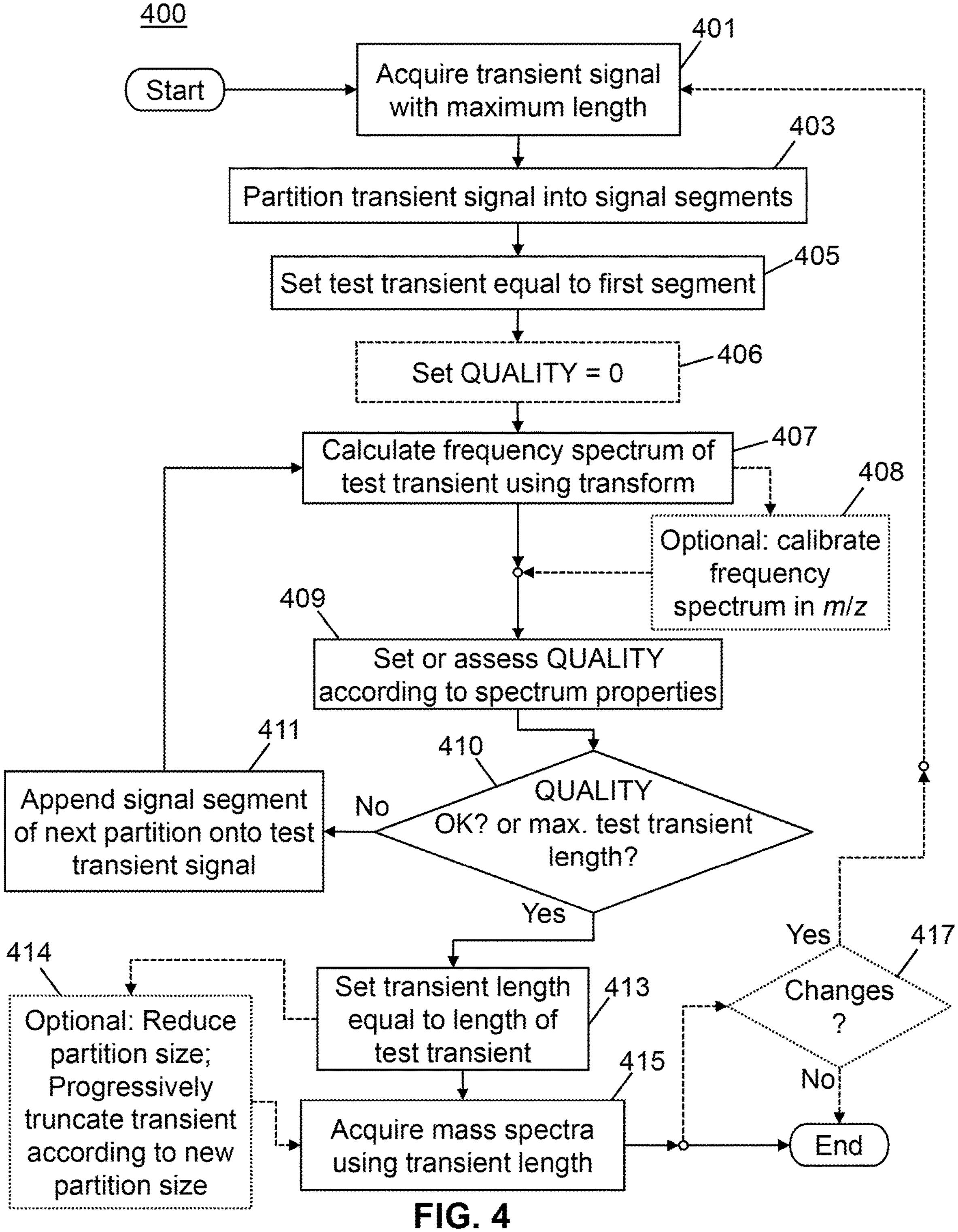
FIG. 4 is a flow diagram of a first method, in accordance with the present teachings, of determining a mass spectral resolution setting of a Fourier Transform mass analyzer.

FIG. 4 is a flow diagram of a first method of determining a mass spectral resolution setting of a Fourier Transform mass analyzer in accordance with the present teachings. In this document the phrase Fourier Transform mass analyzer refers to a type of mass analyzer that generates a transient signal, defined over time, that comprises a superposition of Single Transient Signals, each of which is defined over time and corresponds to a signal of a respective ion species, and from which transient a mass spectrum is calculated using a mathematical transform (generally but not necessarily a Fourier transform) operation. Preferably, the practice of the method 400 employs data acquired from a same sample from which qualitative and/or quantitative analyses of analytes of interest are to be subsequently obtained. In such instances, the illustrated method may comprise a preliminary procedure in preparation for mass spectral analysis of the sample. Additionally, the method may be executed periodically during the course of the mass spectral analysis of the sample, in order to check whether the previously determined resolution remains correct under possibly non-constant experimental conditions, such as changes in the composition of the sample. For example, such composition changes are essentially guaranteed to occur when the sample comprises an effluent stream that is delivered from a liquid or gas chromatograph. Certain steps of the method 400 are better understood with further reference to FIG. 5, which is a schematic plot of a maximum-resolution transient, with the transient signal 31 simply depicted as a shaded area within an envelope 32 in order to avoid a high density of lines. The time point $\tau_0$ represents the commencement of acquisition of an image current signal at some predetermined time after injection of ions into an electrostatic trap and the remaining timpoints, $\tau_1$ through $\tau_{10}$, represent partition boundaries as described further below.

Figure 5:
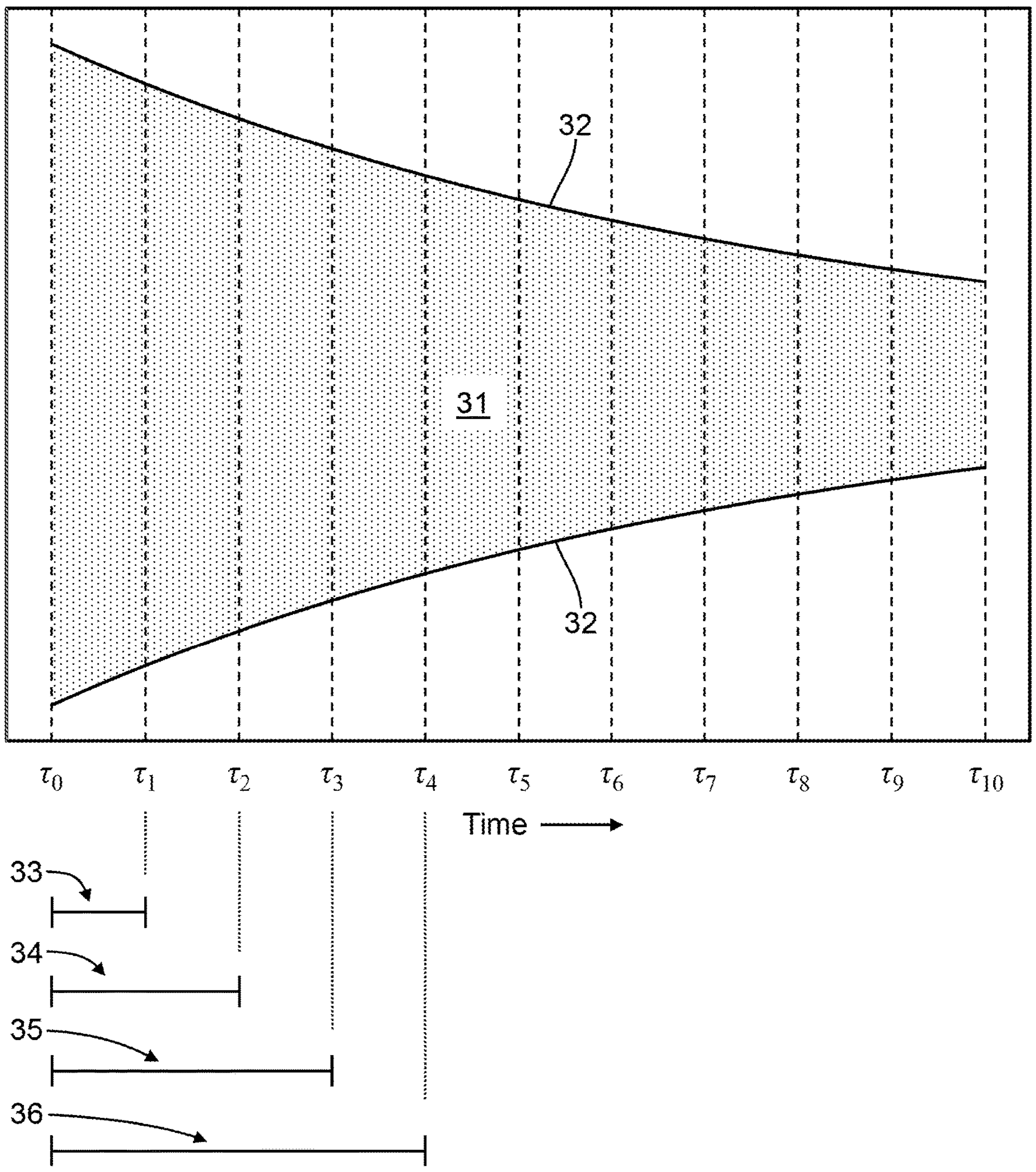
FIG. 5. is a schematic plot of a partitioned maximum-resolution transient showing a progression of increasing-length transient portions as employed by the method of determining a mass spectral resolution setting of a Fourier Transform mass analyzer that is diagramed in FIG. 4.

The first step, step 401 of the method 400 is acquisition of a transient, as generated by motion of ions of the sample within the mass analyzer, using a maximum resolution setting of the mass analyzer. The maximum resolution of the mass analyzer corresponds to a maximum transient length, measured in units of time. Once acquired, the maximum-resolution transient is partitioned, in step 403, into segments bounded by the time points $\tau_0$, $\tau_1$, etc. as indicated in FIG. 5. Although eleven such time points, corresponding to ten transient segments, are depicted in FIG. 5, the method 400 is not limited to any particular number of partitions. The number of partitions employed depends upon the requirements of any particular experimental run, since narrower segments correspond to greater control over the final resolution setting that is determined by execution of the method.

In step 405 of the method 400, a temporary test transient is extracted from the full-resolution transient by setting the test transient to be just the portion of the transient within the first segment, which is bounded by the time points $\tau_0$ and $\tau_1$ and whose transient length, in time units, is indicated by line segment 33 in FIG. 5. In optional step 406, a program variable, denoted here as "QUALITY", may be initialized to zero (or to some other value that indicates that the current test transient must undergo a quality evaluation to determine if its spectral resolution is acceptable). This step 406 will generally be executed in cases in which quality is being determined automatically (i.e., algorithmically) by evaluation of a quantitative quality metric, which may be calculated using, determined by or include one or more factors such as mass spectral resolution, an overall signal-to-noise ratio, a ratio of intensities of two particular mass spectral peaks, a full-width-at half maximum evaluation of one or more peak widths, a confidence interval in the accuracy of curve-fitting of overlapping peaks, etc. The calculation of the quality metric may additionally be based on or may include a variety of instrumental and experimental parameters or constraints that are not specific to particular spectrum, such as class of analytes being analyzed or to be analyzed, time available for analysis, etc. and may vary between analyses, between instruments, between analysts or even over the course of a single set of measurements. Alternatively, the step 406 may be skipped in cases in which quality assessments or considerations of resolution appropriateness are being made (step 409) by means of visual inspection of displayed spectra by a human operator or analyst.

In the next step, step 407 which is part of a possibly-reiterated loop of steps, a frequency spectrum is calculated from the test transient using a mathematical transform operation, such as a Fast-Fourier-Transform (FFT) operation. The calculated frequency spectrum is an uncalibrated representation of a mass spectrum of the sample as would be obtained if the mass analyzer were operated at a resolution setting corresponding to the transient length of the test transient. Since the test transient naturally comprises less information than is available in the full-resolution transient, the resolution of lines in the frequency spectrum is poorer than would be the case if the full-resolution transient signal were transformed. Optionally, the frequency spectrum may be calibrated, in optional step 408, in m/z units if the sample is known to contain or is provided with compounds that yield identifiable lines corresponding to known m/z values or else if instrumental calibration coefficients are already available from a prior calibration.

Regardless of whether the frequency spectrum obtained from the test transient is calibrated, the features of the spectrum may be examined to determine if the spectrum exhibits appropriate resolution in step 409. As noted above, this determination may be performed automatically if it is based on a quantitative metric that may be evaluated from digital spectral data properties. In such situations, the value of the QUALITY variable is reset to a digital value that reflects the value of the metric, as determined for the most recently calculated frequency spectrum or mass spectrum. Alternatively, a graphical spectral representation of all or a portion of the frequency or mass spectrum and/or of a list of digital metric parameters may be displayed to a human analyst or operator who then makes a simple yes/no decision regarding the whether or not the frequency spectrum exhibits an appropriate resolution or whether or not the resolution-dependent quality is adequate.

Step 410 of the method 400 is a decision step at which it is decided if spectral resolution should be further improved. The step 410 may be performed according to any of multiple alternative procedures. For instance, if a QUALITY variable is employed to keep track of a digital quality metric, then step 410 may comprise comparing the most-recently-calculated value of the variable to a pre-determined threshold value. Depending upon how the QUALITY variable is defined, an acceptable resolution or quality may either correspond to a value greater than or equal to the pre-determined threshold value (e.g., signal-to-noise ratio) or less than the pre-determined threshold value (e.g., peak width). Alternatively, the decision step 410 may include prompting for and receiving the results of a subjective assessment by a human operator or analyst, either as a keyed-in or graphical-user-interface response.

Moreover, the term "appropriate resolution", as used in regard to steps 409-410 means any resolution that optimizes one or more of the properties of mass spectral resolution, overall signal-to-noise ratio, a ratio of intensities of two particular mass spectral peaks, a full-width-at half maximum evaluation of one or more peak widths, a confidence interval in the accuracy of curve-fitting of overlapping peaks, a confidence assessment of analyte identification and/or analyte concentration, a minimum level of quantitation, a speed of analysis and/or efficiency of instrument operation. Thus, an appropriate resolution is not necessarily (and frequently will not be) a maximum resolution but is, instead, a resolution that provides a best set of results under a particular set of circumstances, with due regard being given to balancing measures of the various properties listed above, as well as possibly others. The level of resolution that constitutes an "appropriate resolution" in any particular mass spectral analysis may depend on a variety of instrumental and experimental parameters or constraints such as class of analytes, time available for analysis, etc. and may vary between analyses, between instruments, between analysts or even over the course of a single set of measurements.

The "No" branch of decision step 410 is followed either if the maximum available resolution has not been reached after execution of a plurality of transient segment appending steps (step 411) or if the frequency spectrum does not exhibit appropriate resolution or an appropriate resolution-dependent level of quality, as discussed above. In such instances, a new test transient signal is constructed in step 411 by appending the data from the next segment of the full-resolution transient onto the greater-time-point end of the prior test transient signal. With reference to FIG. 5, the second test transient would occupy the portion of the full-resolution transient that is bounded by the time points $\tau_0$ and $\tau_2$, since the second test transient would be constructed by appending the portion of transient 31 that occupies the region between time points $\tau_1$ and $\tau_2$ onto the previous test transient. The second test transient would have a transient length, in time units, is indicated by line segment 34 in FIG. 5.

From step 411, execution of the method returns to step 407, at which a new frequency spectrum is calculated using the most recent version of the test transient signal. Accordingly, step 409 and possibly step 408 are reiterated using the new frequency spectrum corresponding to the most recently constructed test transient. Because the new test transient naturally comprises more information the prior version of the test transient, the resolution of the new frequency generated by the transform operation is expected to have improved resolution, relative to the prior frequency spectrum. In this fashion, the steps 407, 409 and 411 (and possibly step 408) may be repeated multiple times until the resolution, as determined in step 409, improves to an appropriate level. With reference to FIG. 5, subsequent test transients would correspond, in sequence, to the transient portions corresponding to line segments 35 and 36, and possibly others (not indicated) as the loop of steps is repeated.

The "Yes" branch of decision step 410 is followed either if the maximum available resolution has been reached after execution of a plurality of transient segment appending steps (step 411) or if the frequency spectrum has been found or judged to exhibit appropriate resolution or an appropriate resolution-dependent level of quality, as discussed above. In such instances, the transient length for use is subsequent mass spectral data acquisitions is set, at step 413, to the transient length that caused the decision step 410 to follow the "Yes" branch. Unless the optional procedure 414 is executed, the setting of the transient length is equivalent to setting the instrumental resolution to employed during the subsequent acquisition of mass spectra. Subsequently, in step 415, those mass spectra are acquired, using otherwise normal data acquisition procedures, using the setting determined in the execution of method 400. If desired, these spectra may be monitored for changes (optional step 417), either automatically or by a human operator, that may necessitate re-assessment of appropriate mass spectral resolution that is to be used. Such changes may include, for instance, a change in a signal-to-background signal as may occur if the identity of an analyte of interest changes or of there are changes in a matrix within which an analyte is dispersed. If the changes are deemed to require such a re-assessment, then execution returns to step 401.

Figure 6:
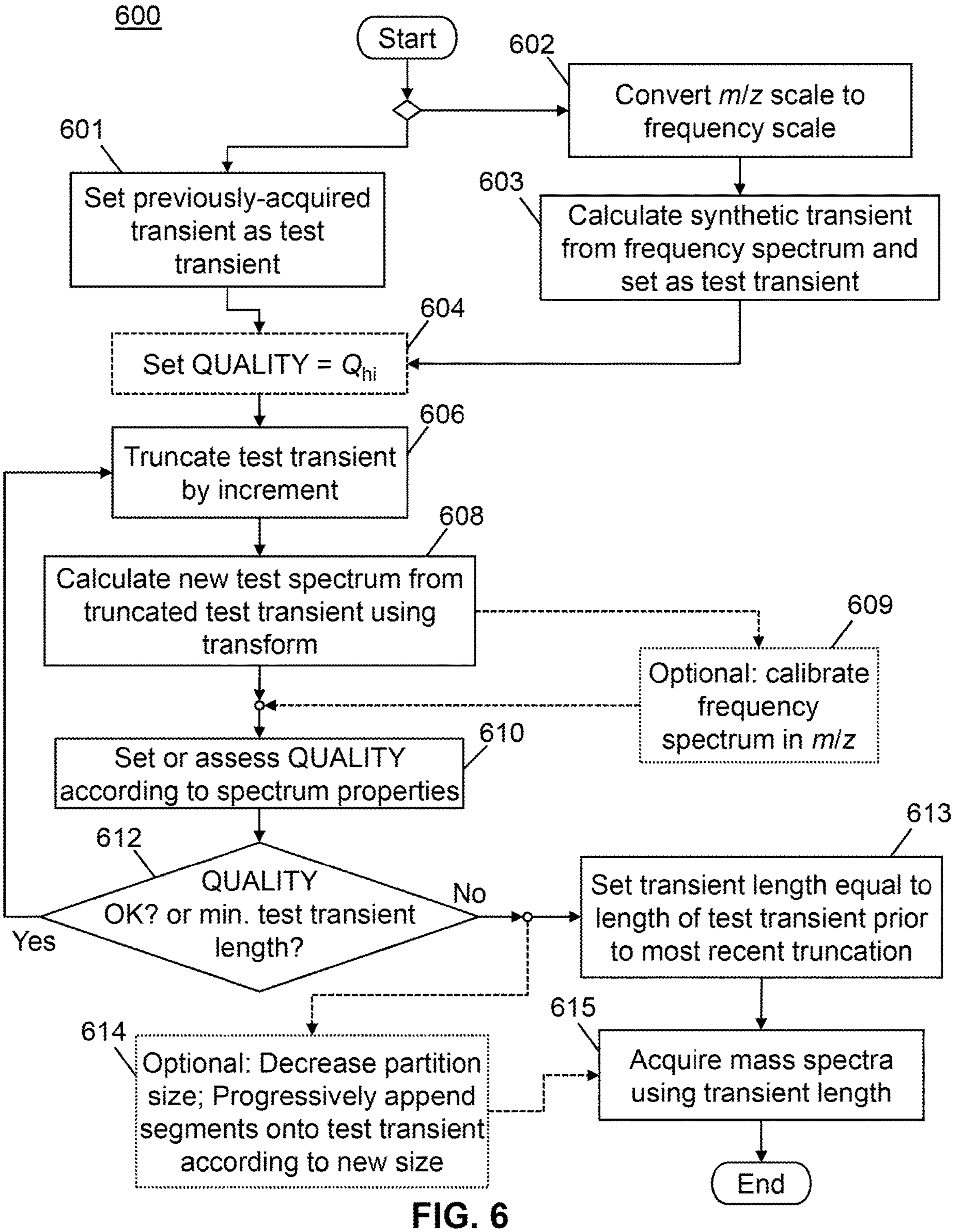
FIG. 6 is a flow diagram of a second method, in accordance with the present teachings, of determining a mass spectral resolution setting of a Fourier Transform mass analyzer.

Under some circumstances, it may be desirable to further refine the mass spectral resolution setting after the frequency spectrum has been found or judged, in decision step 410 to exhibit appropriate resolution or an appropriate resolution-dependent level of quality, as discussed above. The acquisition of a transient by an electrostatic trap mass analyzer may consume a significant amount of measurement time which, in some circumstances, may be in short supply. The transient length set in step 413 may provide greater resolution than is necessary and, thus, may consume more instrument time than is necessary. In such cases, the optional resolution adjustment procedure 414 may be executed before mass spectra are acquired. In this procedure, the partition size is reduced and then, the transient (previously set in step 413) is progressively truncated, at its high-time end, by decrements corresponding to the new, smaller partition size. The resolution adjustment procedure 414 is similar to the method 600 that is discussed below in reference to FIG. 6. In brief, each truncation slightly degrades the resolution. The QUALITY value of the resulting calculated frequency spectrum is assessed after each truncation. The process continues until the resolution or QUALITY is no longer acceptable, at which point the transient length is set at its value prior to the most recent truncation. Because the partition size is smaller than that used in the loop of steps 407-411, this optional procedure 414 is capable of more-precisely determining the boundary between adequate and unacceptable mass spectral resolution.

Method 600 (FIG. 6) is a procedure for determining an appropriate mass spectral resolution from an existing (previously acquired) mass spectrum. The method 600 is suitable when it desired to mass analyze a sample that is similar to the sample from which the previously acquired mass spectrum was obtained, but at a suitably lower mass resolution. For example, the existing mass spectrum may have been acquired at an un-necessarily high resolution. In an initial step 601, an initial test transient may be set equal to the transient that was obtained at the time of the prior measurement, if such a transient is available. Otherwise, if a transient is not available but if a known relationship relating phase, $\varphi_0$ (see Eq. 3), to either frequency, ω see (Eq. 2) or m/z is available, then steps 602 and 603 may be executed as an alternative to step 601. In step 602, the m/z scale of the mass spectrum is converted to a frequency scale using Eq. 2 and a value of the force constant, k, as determined from one or more prior calibrations. Then, in step 603, a synthetic transient may be calculated using the phase versus m/z relationship, the ω values determined in step 602 and relative amplitude, A, values taken from the line intensities of the mass spectrum. The synthetic transient is then set as the initial test transient. The length of the calculated initial test transient is set to be equal to the transient length that corresponds to the maximum available mass spectral resolution.

In optional step 604, a program variable, denoted here as "QUALITY", may be initialized to a value $Q_{hi}$ (or to some other value that indicates that the current test transient must undergo a quality evaluation to determine to what extent the mass spectral resolution may be degraded, relative to that of the previously-acquired mass spectrum, while still remaining acceptable). This step 604 will generally be executed in cases in which quality is being determined automatically (i.e., algorithmically) by evaluation of a quantitative quality metric, such as an overall signal-to-noise ratio, a ratio of intensities of two particular mass spectral peaks, a full-width-at half maximum evaluation of one or more peak widths, a confidence interval in the accuracy of curve-fitting of overlapping peaks, etc. The calculation of the quality metric may additionally be based on or may include a variety of instrumental and experimental parameters or constraints that are not specific to particular spectrum, such as class of analytes being analyzed or to be analyzed, time available for analysis, etc. and may vary between analyses, between instruments, between analysts or even over the course of a single set of measurements. Alternatively, the step 604 may be skipped in cases in which quality assessments or considerations of resolution appropriateness are being made (step 610) by means of visual inspection of displayed spectra by a human operator or analyst.

Steps 606, 608, 610 and 612 (and possibly step 609) of the method 600 comprise a group of steps that may be re-iterated multiple times. In step 606, the prior test transient is truncated by deleting a portion of that transient at the greater-time end, thereby yielding a new, smaller test transient. For example, with reference to FIG. 5, if the transient 31 is taken as the prior test transient defined over the time range $\tau_0$ through $\tau_{10}$, then the next test transient is generated by deleting the portion of the prior transient between time $\tau_9$ and time $\tau_{10}$, the width of which is the increment by which the transient is shortened. This truncation procedure yields a shorter transient defined over the shorter time range $\tau_0$ through $\tau_9$. In step 608, a new test spectrum is calculated (for instance, by means of a Fourier Transform or Fast Fourier Transform procedure) using the most recent truncated test transform. The test spectrum is expected to be a more poorly resolved version of the original mass spectrum, with the resolution decreasing as the test transient becomes shorter.

The test transient and the truncated test transient are both defined over a time domain. Thus, the test spectrum that is calculated in step 608 is defined over a frequency domain. If desired, the test spectrum may be calibrated in terms of m/z units, in an optional calibration step 609, so as to yield a mass spectrum. The calibration may employ calibration coefficients used in the calibration of the previously-acquired mass spectrum of that corresponds to the previously-acquired transient of step 601.

Regardless of whether the frequency spectrum obtained from the test transient is calibrated, the features of the spectrum may be examined to determine if the spectrum exhibits adequate quality and/or appropriate resolution in step 610. As noted above, this determination may be performed automatically if it is based on a quantitative metric that may be evaluated from digital spectral data properties. In such situations, the value of the QUALITY variable is reset, in step 610, to a digital value that reflects the value of the metric, as determined for the most recently calculated frequency spectrum (step 608) or mass spectrum (step 609). Alternatively, a graphical spectral representation of all or a portion of the frequency or mass spectrum and/or of a list of digital metric parameters may be displayed to a human analyst or operator who then makes a simple yes/no decision regarding the whether or not the frequency spectrum exhibits an appropriate resolution or whether or not the resolution-dependent quality is adequate.

Step 612 of the method 600 is a decision step at which it is decided if spectral resolution may be further reduced while still maintaining adequate spectral quality and/or acceptable resolution. If the spectral quality of the test spectrum remains adequate or the resolution of the test spectrum remains appropriate for data acquisition after the most-recent truncation, then execution of the method 600 returns (taking the "Yes" branch of decision step 612) to step 606 and the transient is further truncated. The step 612 may be performed according to any of multiple alternative procedures. For instance, if a QUALITY variable is employed to keep track of a digital quality metric, then step 612 may comprise comparing the most-recently-calculated value of the variable to a pre-determined threshold value. Depending upon how the QUALITY variable is defined, an acceptable resolution or quality may either correspond to a value greater than or equal to the pre-determined threshold value (e.g., signal-to-noise ratio) or less than the pre-determined threshold value (e.g., peak width). Alternatively, the decision step 612 may include prompting for and receiving the results of a subjective assessment by a human operator or analyst, either as a keyed-in or graphical-user-interface response.

Moreover, the term "appropriate resolution", as used in regard to steps 610-612 means any resolution that optimizes one or more of the properties of mass spectral resolution, overall signal-to-noise ratio, a ratio of intensities of two particular mass spectral peaks, a full-width-at half maximum evaluation of one or more peak widths, a confidence interval in the accuracy of curve-fitting of overlapping peaks, a confidence assessment of analyte identification and/or analyte concentration, a minimum level of quantitation, a speed of analysis and/or efficiency of instrument operation. Thus, an appropriate resolution is not necessarily (and frequently will not be) a maximum resolution but is, instead, a resolution that provides a best set of results under a particular set of circumstances, with due regard being given to balancing measures of the various properties listed above, as well as possibly others. The level of resolution that constitutes an "appropriate resolution" in any particular mass spectral analysis may depend on a variety of instrumental and experimental parameters or constraints such as class of analytes, time available for analysis, etc. and may vary between analyses, between instruments, between analysts or even over the course of a single set of measurements.

Looping through steps 606-612 of the method 600 continues until either the mass spectral resolution is determined, in step 612, to be no longer appropriate for planned subsequent mass spectral data acquisition or else the length of the test transient has been truncated to shorter than a pre-determined minimum length. In such circumstances, the transient has been truncated one time too many. Therefore, execution of the method 600 proceeds to step 613, at which the transient length to be employed for subsequent mass spectral data acquisition is set to be equal to the length of the test transient prior to most recent truncation. Provided that optional procedure 614 is not executed, this setting of the transient length is equivalent to setting a mass spectral resolution to be used during the for subsequent mass spectral data acquisition. Finally, the mass spectra are acquired in step 615.

Under some circumstances, it may be desirable to further refine the mass spectral resolution setting after the "No" branch of decision step 612 has been followed. In such circumstance, step 613 is bypassed and the resolution adjustment procedure 614 is executed instead. The procedure 614 is similar to the method 400 that has been discussed above in reference to FIG. 4. Because step 613 is bypassed, the test transient at the beginning of procedure 614 does not yield acceptable quality or resolution. Therefore, in the resolution adjustment procedure 614, the test transient length is progressively increased, in increments corresponding to a new, smaller partition size. Each increase slightly improves the resolution and the QUALITY value of the resulting calculated test spectrum is assessed at each step. The process continues until the resolution or QUALITY is acceptable.

Improved methods for setting a mass spectral resolution to be employed during operation of a Fourier Transform mass spectrometer have been herein disclosed. Various methods taught herein are advantageous in that there is no requirement for the needed experimental resolution to be known in advance by a human operator or analyst and that the resolution, and consequently the spectral acquisition rate, can be changed as needed in real time (while the spectra are being acquired) based on properties of the acquired spectra, such as the levels of the background and analyte signals, the appearance of new lines in the spectra, or the disappearance of previously observed lines from the spectra. The ability to change resolution and spectral acquisition rate in such a data dependent fashion can potentially improve the efficiency of data collection, especially when the spectra are changing with time as a result of the inlet sample stream comprising chromatographic sample fractions that are separated by either liquid or gas chromatography.

The discussion included in this application is intended to serve as a basic description. Although the invention has been described in accordance with the various embodiments shown and described, one of ordinary skill in the art will readily recognize that there could be variations to the embodiments and those variations would be within the spirit and scope of the present invention. The reader should be aware that the specific discussion may not explicitly describe all embodiments possible; many alternatives are implicit. Accordingly, many modifications may be made by one of ordinary skill in the art without departing from the scope and essence of the invention. Neither the description nor the terminology is intended to limit the scope of the invention. Any patents, patent applications, patent application publications or other literature mentioned herein are hereby incorporated by reference herein in their respective entirety as if fully set forth herein.

What is claimed is:

1. A method of operating an electrostatic trapping mass analyzer, comprising:
- operating the electrostatic trapping mass analyzer at a maximum resolution so as to acquire a transient signal of a sample;
- partitioning the transient signal into signal segments;
- defining a test transient as being equal to a first one of the segments;
- calculating a mathematical transform of the test transient and thereby generating a spectrum of component frequencies of the test transient;
- determining a quality metric from the spectrum of component frequencies and comparing the quality metric to either a pre-determined minimum threshold value or a pre-determined maximum threshold value;
- performing, while the most-recently-determined quality metric is either less than the pre-determined minimum threshold value or greater than the pre-determined maximum threshold value, the steps of;
  - appending a next signal segment onto the test transient;
  - re-defining the test transient as being the previously-defined test transient having the appended next signal segment appended thereto;
  - calculating a mathematical transform of the test transient and thereby generating a new spectrum of component frequencies of the test transient; and
  - re-determining the quality metric from the new spectrum of component frequencies; and
- setting an instrumental resolution to be employed for subsequent mass spectral data acquisitions in accordance with a length of the most-recently-defined test transient.

2. A method as recited in claim 1, further comprising calibrating each spectrum of component frequencies in units of mass-to-charge ratio (m/z) so as to generate a respective mass spectrum therefrom.

3. A method as recited in claim 1, wherein each determination of the quality metric is based on one or more of an overall spectral signal-to-noise ratio, a ratio of intensities of two particular spectral peaks and a full-width-at half maximum evaluation of one or more peak widths.

4. A method of operating an electrostatic trapping mass analyzer, comprising:
- retrieving or calculating a transient signal corresponding to a previously acquired mass spectrum, wherein the transient signal is defined over a time domain extending from a first end at time $\tau_0$ to a second end at time $\tau_m$, where $\tau_0<\tau_m$;

defining a test transient as being equal to the retrieved or calculated transient signal;

truncating the previously-defined test transient by eliminating a segment of the previously-defined test transient from the second end of the previously-defined test transient;

calculating a mathematical transform of the test transient and thereby generating a test spectrum therefrom;

determining a quality metric from the test spectrum;

performing, while the most-recently-determined quality metric is either less than a pre-determined minimum threshold value or greater than a pre-determined maximum threshold value, the steps of:

truncating the previously-defined test transient by eliminating a segment of the previously-defined test transient from the end of the previously-defined test transient that is opposite to the first end;

calculating a mathematical transform of the test transient and thereby generating a test spectrum therefrom; and determining the quality metric from the test spectrum;

setting a transient length equal to a length of the test transient prior to most recent truncation; and setting an instrumental resolution to be employed for subsequent mass spectral data acquisitions in accordance with the transient length.

5. A method as recited in claim 4, further comprising calibrating each spectrum of component frequencies in units of mass-to-charge ratio (m/z) so as to generate a respective mass spectrum therefrom.

6. A method as recited in claim 4, wherein each determination of the quality metric is based on one or more of an overall spectral signal-to-noise ratio, a ratio of intensities of two particular spectral peaks and a full-width-at half maximum evaluation of one or more peak widths.

* * * * *